US012668047B2

(12) United States Patent
Qiu et al.

(10) Patent No.: US 12,668,047 B2
(45) Date of Patent: Jun. 30, 2026

(54) PLASTIC FILM, PLASTIC BAG AND PREPARATION METHOD OF PLASTIC FILM

(71) Applicant: GUANGZHOU ARGION ELECTRIC APPLIANCE CO., LTD., Guangzhou (CN)

(72) Inventors: Jianhan Qiu, Guangzhou (CN); Guoqiang Liang, Guangzhou (CN); Xiao Tang, Guangzhou (CN)

(73) Assignee: GUANGZHOU ARGION ELECTRIC APPLIANCE CO., LTD., Guangzhou (CN)

( * ) Notice: Subject to any disclaimer, the term of this patent is extended or adjusted under 35 U.S.C. 154(b) by 397 days.

(21) Appl. No.: 18/214,518

(22) Filed: Jun. 26, 2023

(65) Prior Publication Data

US 2023/0339223 A1 Oct. 26, 2023

Related U.S. Application Data

(63) Continuation-in-part of application No. PCT/CN2021/124852, filed on Oct. 20, 2021.

(30) Foreign Application Priority Data

Dec. 24, 2020 (CN) .......................... 202011574188.2

(51) Int. Cl.
| | |
|---|---|
| *B32B 23/08* | (2006.01) |
| *B32B 7/12* | (2006.01) |
| *B32B 27/08* | (2006.01) |
| *B32B 27/36* | (2006.01) |

(52) U.S. Cl.
CPC ................ *B32B 27/36* (2013.01); *B32B 7/12* (2013.01); *B32B 23/08* (2013.01); *B32B 27/08* (2013.01); *B32B 2250/03* (2013.01); *B32B 2255/10* (2013.01); *B32B 2255/205* (2013.01); *B32B 2255/26* (2013.01); *B32B 2307/538* (2013.01); *B32B 2307/7163* (2013.01); *B32B 2553/00* (2013.01)

(58) Field of Classification Search
CPC ........... B32B 27/36; B32B 7/12; B32B 23/08; B32B 27/08; B32B 2250/03; B32B 2255/10; B32B 2255/205; B32B 2255/26; B32B 2307/538; B32B 2307/7163; B32B 2553/00; B32B 27/304; B32B 29/002; C08J 7/042
See application file for complete search history.

(56) References Cited

U.S. PATENT DOCUMENTS

| | | | |
|---|---|---|---|
| 2010/0055428 A1 | 3/2010 | Kim et al. | |
| 2013/0071677 A1* | 3/2013 | Penttinen .............. | B32B 27/308 |
| | | | 427/407.1 |
| 2014/0329065 A1* | 11/2014 | Chung .................... | B32B 27/12 |
| | | | 428/207 |
| 2018/0281359 A1* | 10/2018 | Neuman ............... | B32B 27/306 |
| 2020/0290328 A1* | 9/2020 | Neuman ................ | B32B 27/08 |
| 2023/0405983 A1* | 12/2023 | Bras ........................ | B32B 27/32 |

FOREIGN PATENT DOCUMENTS

| | | |
|---|---|---|
| CN | 109968755 A | 7/2019 |
| CN | 112351944 A | 2/2021 |
| EP | 3388229 A1 | 10/2018 |
| GB | 1327145 A | 8/1973 |

OTHER PUBLICATIONS

International Search Report of PCT Patent Application No. PCT/CN2021/124852 issued on Dec. 3, 2021.
Qian Duan, Preparation of PLA/PBAT Composite Films and Their Barrier Properties, Nov. 6, 2020, pp. 3-7, 10, 15-19 and 21-28.
Zichen Yang et al., Applications and Trends of Polyvinylidene Chloride Film in Food Packaging, Jan. 25, 2017, pp. 26-28, No. 1.
Jianqing Wang et al., Packaging Material Science, Feb. 28, 2017, pp. 284-285.
Yi Tong et al., Preparation and Characterization of Blown Films with High Content of PLA, China Plastics Industry, Jul. 20, 2017, pp. 27-31, vol. 45, No. 7.
Xiangyu Yan et al., Preparation and Characterization of PLA/PBAT/PDEGA Blends, China Synthetic Besin and Plastics, Sep. 25, 2018, pp. 40-44, vol. 35, No. 5.

* cited by examiner

*Primary Examiner* — Blaine Copenheaver

(57) ABSTRACT

The present disclosure provides a plastic film, including: a film A and a film B, where a material of the film A includes at least one selected from the group consisting of polylactic acid (PLA), poly(butylene adipate-co-terephthalate) (PBAT), and poly(butylene succinate) (PBS); the film B includes a base layer and a coating layer, and the coating layer covers the base layer; the film A and the film B are laminated; and a material of the coating layer is polyvinylidene chloride (PVDC) and a material of the base layer is cellulose, or a material of the coating layer is aluminum oxide and a material of the base layer is PLA. It has been found that the plastic film has excellent water resistance, gas tightness, and mechanical performance, is biodegradable, and can be widely used in food packaging bags.

15 Claims, No Drawings

PLASTIC FILM, PLASTIC BAG AND PREPARATION METHOD OF PLASTIC FILM

CROSS-REFERENCE TO RELATED APPLICATIONS

The present application is a continuation-in-part application of PCT application No. PCT/CN2021/124852 filed on Oct. 20, 2021, which claims the benefit of Chinese Patent Application No. 202011574188.2 filed on Dec. 24, 2020. The contents of all of the aforementioned applications are incorporated by reference herein in their entirety.

TECHNICAL FIELD

The present disclosure relates to the field of polymer composites, and specifically relates to a plastic film, a plastic bag, and a preparation method of the plastic film.

BACKGROUND

Currently, common food packaging bags on the market are mainly made of polyamide (PA), polyester (PET), a metal film (such as aluminum foil), polyethylene (PE), random copolymer polypropylene (RCPP), or the like. Existing food packaging bags have good water resistance, gas tightness, and mechanical performance, but these food packaging bags are non-biodegradable.

SUMMARY

An objective of the present disclosure is to overcome the shortcomings in the prior art and provide a plastic film, a plastic bag, and a preparation method of the plastic film.

To achieve the objective above, the present disclosure adopts the following technical solutions:

The present disclosure provides a plastic film, including: a film A and a film B, wherein a material of the film A includes at least one selected from the group consisting of polylactic acid (PLA), poly(butylene adipate-co-terephthalate) (PBAT), and poly(butylene succinate) (PBS); the film B includes a base layer and a coating layer, and the coating layer covers the base layer; the film A and the film B are laminated; and a material of the coating layer is polyvinylidene chloride (PVDC) and a material of the base layer is cellulose, or a material of the coating layer is aluminum oxide and a material of the base layer is PLA, or a material of the coating layer is PVDC and a material of the base layer is PLA, or a material of the coating layer is aluminum oxide and a material of the base layer is cellulose.

The inventors have found through research that the plastic film prepared by compounding at least one selected from the group consisting of PLA, PBAT, and PBS with a cellulose film and PVDC has excellent water resistance, gas tightness, and mechanical performance, is biodegradable, and can be widely used in food packaging bags, which overcomes the problem that the existing food packaging bags are non-biodegradable.

Preferably, the material of the film A includes PLA and PBAT.

The inventors have found through research that a film A prepared with a combination of PLA and PBAT has better water resistance, gas tightness, mechanical performance, and biodegradability than a single-component film A.

Preferably, the PLA, the PBAT, the cellulose, and the PVDC in the plastic film are in a weight ratio of (10-20):(45-65):(20-35):(2-5).

Preferably, the PLA, the PBAT, the cellulose, and the PVDC in the plastic film are in a weight ratio of (12-18):(50-60):(20-35):(2-5).

The inventors have found through research that, when the weight ratio of the components in the plastic film meets the condition above, the plastic film has excellent water resistance, gas tightness, mechanical performance, and biodegradability.

Preferably, the PLA, the PBAT, the cellulose, and the PVDC in the plastic film are in a weight ratio of (12-18):(55-60):(24-32):(2-5).

The inventors have found through research that, when the weight ratio of the components in the plastic film meets the condition above, the plastic film has excellent water resistance, gas tightness, mechanical performance, and biodegradability.

Preferably, the PLA, the PBAT, the cellulose, and the PVDC in the plastic film are in a weight ratio of (12-18):(55-60):(24-32):(3-4).

The inventors have found through research that, when the weight ratio of the components in the plastic film meets the condition above, the plastic film has excellent water resistance, gas tightness, mechanical performance, and biodegradability.

Preferably, the PLA, the PBAT, the cellulose, and the PVDC in the plastic film are in a weight ratio of (15-18):(55-60):(24-28):(3-4).

The inventors have found through research that, when the weight ratio of the components in the plastic film meets the condition above, the plastic film has excellent water resistance, gas tightness, mechanical performance, and biodegradability.

Preferably, a surface of the plastic film is provided with an uneven pattern; the pattern has a roughness Ra of 0.1 mm to 0.2 mm; and in the pattern, a distance between a wave crest and a wave trough that are adjacent is 1.2 mm to 4 mm, and a height difference between a wave crest and a wave trough that are adjacent is 0.18 mm to 0.4 mm.

After the pattern is provided on the surface of the plastic film, a plastic bag prepared from the plastic film can be vacuumed. Patterns on the surface of the plastic film overlap to form a gas path, such that a gas in the plastic bag can be extracted to a maximum extent, which can reduce a vacuum degree of vacuum pumping for the plastic bag to a great extent.

The present disclosure also provides a preparation method of the plastic film, including the following steps:

(1) according to a weight ratio, compounding at least one selected from the group consisting of PLA, PBAT, and PBS and then extruding to obtain the film A;

(2) according to a weight ratio, compounding the cellulose and then extruding to obtain a base layer of a cellulose film of the film B, and coating the PVDC on a surface of the base layer of the cellulose film to obtain the film B; and (3) laminating the film A and the film B into the plastic film through an adhesive.

The present disclosure also provides a plastic bag prepared from the plastic film above.

The present disclosure also provides a method of packaging food, including using the plastic bag for food packaging.

The present disclosure has the following beneficial effects: The present disclosure provides a plastic film, a plastic bag, and a preparation method of the plastic film. In the present disclosure, at least one selected from the group consisting of PLA, PBAT, and PBS is compounded with a cellulose film and PVDC to prepare the plastic film. It has been found that the plastic film has excellent water resistance, gas tightness, and mechanical performance, is biodegradable, and can be widely used in food packaging bags, which overcomes the problem that the existing food packaging bags are non-biodegradable.

DETAILED DESCRIPTION

In the present disclosure, the term "laminating" or "are/were laminated" refers to a molding method in which multilayer adhesive sheets (corresponding to film A and film B in the present application) are coated with an adhesive by a laminating equipment and compounded into laminated plastics at a certain temperature and pressure.

In order to well illustrate the objective, technical solutions, and advantages of the present disclosure, the present disclosure will be further described below in conjunction with specific examples.

Example 1

As an example of the present disclosure, a plastic film was provided, including: a film A and a film B, where the film A was composed of PLA and PBAT; the film B included a cellulose base layer and a coating layer, and the coating layer covered the cellulose base layer; a material of the coating layer was PVDC; the film A and the film B were laminated through a glue, and a weight of the glue was 0.9% of a weight of the plastic film;

The PLA, the PBAT, the cellulose, and the PVDC in the plastic film were in a weight ratio of 14.8:59.2:22.8:2.3; and the plastic film had a thickness of 75 m.

A surface of the plastic film was provided with an uneven pattern; the pattern had a roughness Ra of 0.1 mm to 0.2 mm; and in the pattern, a distance between a wave crest and a wave trough that are adjacent was 1.2 mm to 4 mm, and a height difference between a wave crest and a wave trough that are adjacent was 0.18 mm to 0.4 mm.

In this example, a preparation method of the plastic film was provided, including the following steps:

(1) According to a weight ratio, PLA and PBAT were compounded and extruded to obtain the film A.

(2) According to a weight ratio, cellulose was compounded and extruded to obtain a base layer of a cellulose film of the film B, and a PVDC emulsion was coated on a surface of the base layer of the cellulose film and then oven-dried and cured in an oven to obtain the film B.

(3) The film A and the film B were laminated through an adhesive and then embossed to obtain the plastic film.

Example 2

As an example of the present disclosure, a plastic film was provided, including: a film A and a film B, where the film A was composed of PLA and PBAT; the film B included a cellulose base layer and a coating layer, and the coating layer covered the cellulose base layer; a material of the coating layer was PVDC; the film A and the film B were bonded by glue and then laminated, and a weight of the glue was 0.7% of a weight of the plastic film;

The PLA, the PBAT, the cellulose, and the PVDC in the plastic film were in a weight ratio of 13.3:52.5:30:3; and the plastic film had a thickness of 110 m.

A surface of the plastic film was provided with an uneven pattern; the pattern had a roughness Ra of 0.1 mm to 0.2 mm; and in the pattern, a distance between a wave crest and a wave trough that are adjacent was 1.2 mm to 4 mm, and a height difference between a wave crest and a wave trough that are adjacent was 0.18 mm to 0.4 mm.

In this example, a preparation method of the plastic film was provided, including the following steps:

(1) According to a weight ratio, PLA and PBAT were compounded and extruded to obtain the film A.

(2) According to a weight ratio, cellulose was compounded and extruded to obtain a base layer of a cellulose film of the film B, and a PVDC emulsion was coated on a surface of the base layer of the cellulose film and then oven-dried and cured in an oven to obtain the film B.

(3) The film A and the film B were laminated through an adhesive and then embossed to obtain the plastic film.

Comparative Example 1

As a comparative example of the present disclosure, a plastic film was provided, which was different from Example 1 only in that: the plastic film included the film A but did not include the film B, and the film A was composed of PLA and PBAT.

Comparative Example 2

As a comparative example of the present disclosure, a plastic film was provided, which was different from Example 1 only in that: the plastic film included the film A and cellulose, but did not include the PVDC coating layer.

Comparative Example 3

As a comparative example of the present disclosure, a plastic film was provided, which was different from Example 1 only in that: KPT (cellulose and PVDC coating layer, wherein "K" stands for PVDC, and "PT" stands for cellophane (cellulose)) was used instead of PBAT.

Performance Testing

1. The plastic films prepared in Examples 1 and 2 and Comparative Examples 1 to 3 each were tested for an oxygen transmission rate (OTR) and a water vapor transmission rate (WVTR). The OTR was tested with reference to GB/T 1038-2000 "Test method For Gas Permeability of Plastic film and Sheet (Differential Pressure Method)" under the following test conditions: $T=(23\pm0.5)$ ° C. and RH=0%. The WVTR was tested with reference to GB/T 1037-1988 "Test Method For Water Vapor Permeability of Plastic film and Sheet (Cup Method)" under the following test conditions: $T=(38\pm0.6)$ ° C. and RH=$(90\pm2)$%. Test results were shown in Table 1.

TABLE 1

| Gas tightness and water resistance of the plastic films | | |
| --- | --- | --- |
| Sample | OTR, cm3/ $(m_2 \cdot 24\ h \cdot 0.1\ Mpa)$ | WVTR, g/ $(m_2 \cdot 24\ h)$ |
| Example 1 | 0.1 | 13 |
| Example 2 | 0.1 | 13 |
| Comparative Example 1 | 1280 | 297 |
| Comparative Example 2 | 0.1 | 277 |
| Comparative Example 3 | 0.1 | 13 |

5

2. Biodegradability of a Plastic Film

The plastic film of Example 2 was tested for biodegradability in accordance with the standard EU13432-2012, where duplicate samples of the plastic film of Example 2 were tested.

TABLE 2

| | Biodegradability of the plastic film | | | | |
| --- | --- | --- | --- | --- | --- |
| | Weight of a residual sample/g | | | | Degra- |
| | | | Final | | dation |
| Sample | Initial | 2 mm to 10 mm | >10 mm | Total | rate |
| Duplicate sample 1 of Example 2 | 300 | 3 | 19.5 | 22.5 | 92.5% |
| Duplicate sample 2 of Example 2 | 300 | 7 | 2.2 | 29 | 90.3% |

3. Mechanical Performance

The plastic films in Examples 1 and 2 were tested for mechanical performance, and test results were shown in Table 3.

TABLE 3

| Mechanical performance of the plastic films in Examples 1 and 2 | | |
| --- | --- | --- |
| Sample performance | the plastic film in Example 1 | the plastic film in Example 2 |
| Heat seal strength | 15.8 N/15 mm | 22.03 N/15 mm |
| Longitudinal elongation | 23.8% | 36.8% |
| Longitudinal tensile strength | 36.6 N/mm$^2$ | 40.86 N/mm$^2$ |
| Transverse elongation | 94.6% | 74.4% |
| Transverse tensile strength | 19.98 N/mm$^2$ | 23.94 N/mm$^2$ |
| Transverse right-angled tearing force | 10.12 N | 11.73 N |
| Transverse right-angled tearing strength | 134.93 N/mm | 106.63 N/mm |
| Longitudinal right-angled tearing force | 10.47 N | 17.37 N |
| Longitudinal right-angled tearing strength | 139.6 N/mm | 157.9 N/mm |
| Pendulum impact resistance | 0.93 J | 1.13 J |
| Friction coefficient (outer) | Static: 0.6, dynamic: 0.42 | Static: 0.6, dynamic: 0.42 |
| Friction coefficient (inner) | Static: 0.14, dynamic: 0.12 | Static: 0.14, dynamic: 0.12 |
| Peeling strength | 1.73 N | 1.5 N |
| Heat sealing range | 118° C.-125° C. | 122° C.-130° C. |

Finally, it should be noted that the examples above are provided merely to describe the technical solutions of the present disclosure, rather than to limit the protection scope of the present disclosure. Although the present disclosure is described in detail with reference to preferred examples, a person of ordinary skill in the art should understand that modifications or equivalent replacements may be made to the technical solutions of the present disclosure without departing from the spirit and scope of the technical solutions of the present disclosure.

The invention claimed is:

1. A plastic film, comprising: a film A and a film B, wherein a material of the film consists of polylactic acid (PLA) and poly(butylene adipate-co-terephthalate) (PBAT); the film B consists of a base layer and a coating layer, and the coating layer covers the base layer; the film A and the film B are laminated;

a material of the coating layer is polyvinylidene chloride (PVDC) and a material of the base layer is cellulose, and

an oxygen transmission rate (OTR) of the plastic film is 0.1 cm$^3$/(m$^2$·24 h·0.1 Mpa).

2. The plastic film according to claim 1, wherein the PLA, the PBAT, the cellulose, and the PVDC in the plastic film are in a weight ratio of (10-20):(45-65):(20-35):(2-5).

3. The plastic film according to claim 2, wherein a surface of the plastic film is provided with an uneven pattern; the pattern has a roughness Ra of 0.1 mm to 0.2 mm; and in the pattern, a distance between a wave crest and a wave trough that are adjacent is 1.2 mm to 4 mm, and a height difference between a wave crest and a wave trough that are adjacent is 0.18 mm to 0.4 mm.

4. The plastic film according to claim 2, wherein the PLA, the PBAT, the cellulose, and the PVDC in the plastic film are in a weight ratio of (12-18):(50-60):(20-35):(2-5).

5. The plastic film according to claim 4, wherein the PLA, the PBAT, the cellulose, and the PVDC in the plastic film are in a weight ratio of (13.3-14.8):(52.5-59.2):(22.8-30):(2.3-3).

6. The plastic film according to claim 1, wherein a surface of the plastic film is provided with an uneven pattern; the pattern has a roughness Ra of 0.1 mm to 0.2 mm; and in the pattern, a distance between a wave crest and a wave trough that are adjacent is 1.2 mm to 4 mm, and a height difference between a wave crest and a wave trough that are adjacent is 0.18 mm to 0.4 mm.

7. A preparation method of the plastic film according to claim 2, comprising the following steps:

(1) according to the weight ratio, compounding the PLA and the PBAT and then extruding to obtain the film A;

(2) according to a weight ratio, compounding the cellulose and then extruding to obtain a base layer of a cellulose film of the film B, and coating the PVDC on a surface of the base layer of the cellulose film to obtain the film B; and (3) laminating the film A and the film B into the plastic film through an adhesive.

8. A preparation method of the plastic film according to claim 4, comprising the following steps:

(1) according to the weight ratio, compounding the PLA and the PBAT and then extruding to obtain the film A;

(2) according to a weight ratio, compounding the cellulose and then extruding to obtain a base layer of a cellulose film of the film B, and coating the PVDC on a surface of the base layer of the cellulose film to obtain the film B; and (3) laminating the film A and the film B into the plastic film through an adhesive.

9. A preparation method of the plastic film according to claim 5, comprising the following steps:

(1) according to the weight ratio, compounding the PLA and the PBAT and then extruding to obtain the film A;

(2) according to a weight ratio, compounding the cellulose and then extruding to obtain a base layer of a cellulose film of the film B, and coating the PVDC on a surface of the base layer of the cellulose film to obtain the film B; and (3) laminating the film A and the film B into the plastic film through an adhesive.

10. A plastic bag prepared from the plastic film according to claim 1.

11. A method of packaging food, comprising using the plastic bag according to claim 10 for food packaging.

12. A plastic bag prepared from the plastic film according to claim 2.

13. A method of packaging food, comprising using the plastic bag according to claim 12 for food packaging.

14. A plastic bag prepared from the plastic film according to claim 6.

15. A method of packaging food, comprising using the plastic bag according to claim 14 for food packaging.

\* \* \* \* \*